(12) United States Patent
Asao et al.

(10) Patent No.: US 11,173,952 B2
(45) Date of Patent: Nov. 16, 2021

(54) ELECTRIC POWER STEERING DEVICE

(71) Applicant: Mitsubishi Electric Corporation, Tokyo (JP)

(72) Inventors: Yoshihito Asao, Tokyo (JP); Satoru Akutsu, Tokyo (JP); Akihiko Mori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/327,242

(22) PCT Filed: Oct. 22, 2014

(86) PCT No.: PCT/JP2014/078055
§ 371 (c)(1),
(2) Date: Jan. 18, 2017

(87) PCT Pub. No.: WO2016/063368
PCT Pub. Date: Apr. 28, 2016

(65) Prior Publication Data
US 2017/0166248 A1    Jun. 15, 2017

(51) Int. Cl.
*B62D 5/04* (2006.01)
*H02P 29/028* (2016.01)
(Continued)

(52) U.S. Cl.
CPC ......... *B62D 5/0487* (2013.01); *B62D 5/0484* (2013.01); *B62D 5/0493* (2013.01);
(Continued)

(58) Field of Classification Search
CPC .. H05K 7/20209; G06F 1/206; H02H 7/0852; H02H 6/005; F04D 27/004
(Continued)

(56) References Cited

U.S. PATENT DOCUMENTS 5,414,339 A     5/1995  Masaki et al.
2003/0107339 A1  6/2003 Shimizu et al.
(Continued)

FOREIGN PATENT DOCUMENTS

EP  0 588 628 A1   3/1994
EP  2 278 700 A1   1/2011
(Continued)

OTHER PUBLICATIONS

Communication dated Jun. 6, 2017, from the Japanese Patent Office in counterpart application No. 2016-554995.
(Continued)

*Primary Examiner* — Kawing Chan
*Assistant Examiner* — Bradley Brown
(74) *Attorney, Agent, or Firm* — Sughrue Mion, PLLC; Richard C. Turner (57) ABSTRACT

With an object of allowing steering wheel operation to be carried out easily at a normal time and when an abnormality occurs, the invention includes a motor having two windings and a control unit having two control systems that supply control signals to each winding of the motor, and when an abnormality occurs in one winding of the motor or in one system inside the control unit, a supply of current to the winding in which the abnormality has occurred is cut to zero, and the motor is driven by a predetermined current necessary at a normal time being supplied to the other winding, while at a time of a normal drive when no abnormality has occurred, the current supply is shared between the two windings, whereby the motor is driven.

17 Claims, 5 Drawing Sheets

(51) Int. Cl.
*H02P 29/00* (2016.01)
*H02P 25/16* (2006.01)
*H02P 29/032* (2016.01)

(52) U.S. Cl.
CPC .............. *H02P 25/16* (2013.01); *H02P 29/00* (2013.01); *H02P 29/028* (2013.01); *H02P 29/032* (2016.02)

(58) Field of Classification Search
USPC ........................................................ 318/471
See application file for complete search history.

(56) References Cited

U.S. PATENT DOCUMENTS

| | | | |
|---|---|---|---|
| 2005/0159866 | A1 | 7/2005 | Takeuchi et al. |
| 2008/0019062 | A1* | 1/2008 | Dooley .................... H02K 3/16 361/23 |
| 2011/0156627 | A1 | 6/2011 | Nakamura et al. |
| 2011/0156629 | A1* | 6/2011 | Satou .................... B62D 5/0487 318/453 |
| 2011/0315470 | A1 | 12/2011 | Uryu |
| 2012/0200191 | A1* | 8/2012 | Baba .................. H02K 15/0464 310/201 |
| 2013/0299271 | A1* | 11/2013 | Endo ...................... B62D 5/046 180/446 |
| 2014/0009093 | A1* | 1/2014 | Suzuki ..................... H02P 21/50 318/400.02 |
| 2016/0244089 | A1* | 8/2016 | Scotson ............... B62D 5/0487 |
| 2016/0332660 | A1* | 11/2016 | Sasaki .................... B62D 6/002 |

FOREIGN PATENT DOCUMENTS

| | | |
|---|---|---|
| JP | 08-119132 A | 5/1996 |
| JP | 2003-102189 A | 4/2003 |
| JP | 2003-174793 A | 6/2003 |
| JP | 2006-168482 A | 6/2006 |
| JP | 3839358 B2 | 11/2006 |
| JP | 5229645 B2 | 7/2013 |
| JP | 2013-236486 A | 11/2013 |
| JP | 2014-014240 A | 1/2014 |

OTHER PUBLICATIONS

International Search Report for PCT/JP2014/078055, dated Feb. 3, 2015.
Communication dated Sep. 5, 2017, from the Japanese Patent Office in counterpart application No. 2016-554995.
Extended European Search Report dated May 25, 2018 issued by the European Patent Office in counterpart application No. 14904267.3.
Communication dated Aug. 3, 2018, issued by the State Intellectual Property Office of People's English Republic of China in counterpart application No. 201480082838.8.
Communication from Intellectual Property of India dated Jul. 25, 2019, in Application No. 201747012225.
Communication dated Apr. 16, 2019 from the State Intellectual Property Office of the P.R.C. in application No. 201480082838.8.
Communication dated Dec. 4, 2019, from the China National Intellectual Property Administration in counterpart Application No. 201480082838.8.
Office Action dated May 19, 2020 in European Application No. 14904267.3.

* cited by examiner

ELECTRIC POWER STEERING DEVICE

CROSS REFERENCE TO RELATED APPLICATIONS

This is a National Stage of International Application No. PCT/JP2014/078055 filed Oct. 22, 2014, the contents of all of which are incorporated herein by reference in their entirety.

TECHNICAL FIELD

The present invention relates in particular to an electric power steering device wherein a motor and control unit are of a redundant system configuration.

BACKGROUND ART

As an existing electric steering device, there is a device wherein two coil windings are provided in a motor, a control unit having two inverter circuits that can independently drive the two coil windings is included, the two inverter circuits are controlled in concert, and motor drive is continued using only a normally operating inverter circuit when there is an abnormality. Furthermore, in addition to control unit inverter circuits, an electric power steering device that handles a failure as a dual system is also known (Patent Document 1).

CITATION LIST

Patent Literature

PTL 1: Japanese Patent No. 3,839,358

SUMMARY OF INVENTION

Technical Problem

The existing electric power steering device disclosed in Patent Document 1 is such that although motor drive can be carried out at 100%, as per the specifications, at a normal time (when no abnormality has occurred), only approximately 50% of the drive can be carried out at an abnormal time, with which steering of an actual vehicle cannot be carried out sufficiently. In particular, when cruising at low speed, there is a problem in that a steering wheel cannot be rotated when the steering wheel is operated by a powerless driver, and it is difficult to maintain the safety of the vehicle.

The invention, having been contrived in order to resolve the problem of the heretofore described kind of existing device, provides an electric power steering device such that steering wheel operation can be carried out easily at an abnormal time in the same way as at a normal time.

Solution to Problem

An electric power steering device according to the invention includes an electric motor that causes a vehicle steering mechanism to rotate, and a control unit that drives the motor, the motor having a stator including two independent windings with respect to a single rotor, and the control unit being formed of two control systems that supply control signals to each of the motor windings, wherein the control unit is configured so as to, when an abnormality occurs in one winding of the motor or in one system inside the control unit, cut a supply of current to the winding in which the abnormality has occurred to zero and drive the motor by supplying a predetermined current necessary at a normal time to the other winding, and configured so as to share a supply of current between the two windings at a time of normal drive when no abnormality has occurred, thereby driving the motor.

Advantageous Effects of Invention

According to the invention, a configuration is such that when an abnormality occurs in one winding of a motor or in one system inside control means, a supply of current to the motor winding in which the abnormality has occurred is cut to zero and the motor is driven by the other winding using a predetermined necessary current in the same way as at a normal time, and configuration is such that the motor is driven by the two windings at a time of normal drive when no abnormality has occurred, whereby a steering wheel operation can be carried out easily at an abnormal time in the same way as at a normal time.

DESCRIPTION OF EMBODIMENTS

First Embodiment

Hereafter, the invention will be described based on FIG. 1 to FIG. 3, which show a first embodiment.

Figure 1:
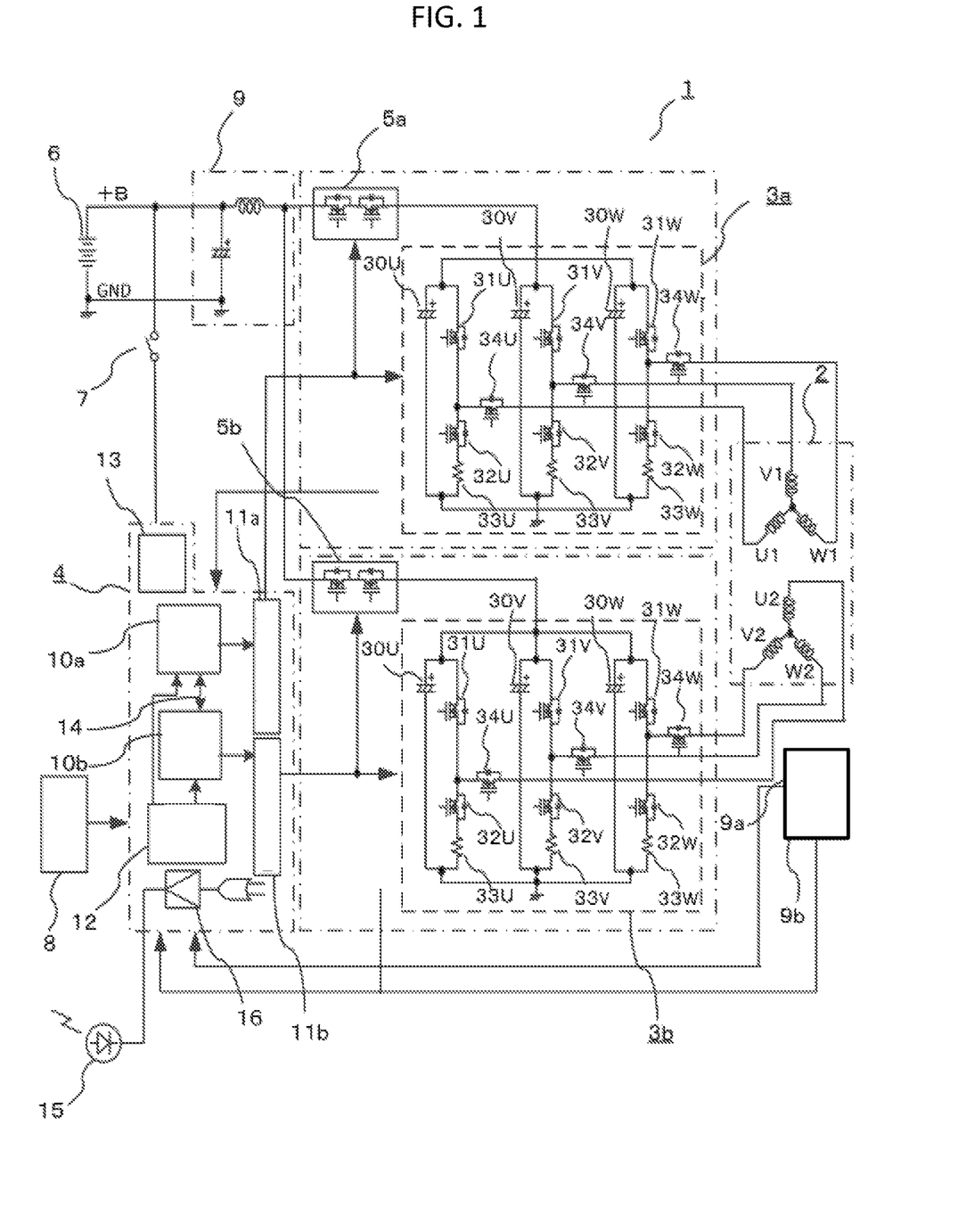
FIG. 1 is a circuit diagram showing a main portion configuration of an electric power steering device according to a first embodiment of the invention.

FIG. 1 is a circuit diagram showing a main portion configuration of an electric power steering device.

In the drawings, a control unit 1 controls the drive of a motor 2 including two 3-phase coil windings, thereby controlling a steering wheel, and is configured of so-called inverter circuits 3a and 3b, a control circuit unit 4 in which are mounted central processing units (hereafter called CPUs) 10a and 10b, power supply relay switching elements 5a and 5b, and the like. Also, power supplies +B and GND are supplied from a battery 6 mounted in a vehicle, the power is supplied via an ignition switch 7 and power supply circuit 13 to the control circuit unit 4, and furthermore, information from, for example, a torque sensor mounted in the vicinity of the steering wheel and detecting steering wheel torque, a speed sensor that detects vehicle cruising speed, and the like, is input into the control circuit unit 4 from a sensor 8.

Information from the sensor 8 is transmitted to the CPUs 10a and 10b via an input circuit 12 of the control circuit unit 4. The CPUs 10a and 10b calculate a current value for causing the motor 2 to rotate based on the input information, and output a control signal to drive circuits 11a and 11b. The drive circuits 11a and 11b individually receive an input signal, and output control signals that drive switching elements of the inverter circuits 3a and 3b.

Upper and lower arm switching elements 31U, 31V, 31W, 32U, 32V, and 32W that supply output current to 3-phase coil windings U1, V1, and W1 of the motor 2, motor relay switching elements 34U, 34V, and 34W that connect or disconnect wiring with the coil windings U1, V1, and W1 of the motor 2, current detecting shunt resistors 33U, 33V, and 33W, and a noise restricting capacitor 30, are provided in each of the inverter circuits 3a and 3b. The inverter circuits 3a and 3b have the same circuit configuration with respect to the winding of each phase (U1, V1, W1) and (U2, V2, W2), and are configured so as to be able to carry out a supply of current to each phase winding independently.

Also, a potential difference across terminals of the shunt resistor 33 and, for example, voltage of coil winding terminals of the motor 2, and the like, are also input into the input circuit 12. Configuration is such that these items of information are also input into the CPUs 10a and 10b, a difference from detected values corresponding to the calculated current value is calculated, and a so-called feedback control is carried out, assisting steering power by supplying a desired motor current. Control signals are also output from the power supply relay switching elements 5a and 5b, and the current supply to the motor 2 can be cut off by the power supply relay switching elements 5a and 5b. In the same way, the motor relay switching elements 34U, 34V, and 34W can also independently cut off the output of each phase.

Herein, the CPUs 10a and 10b include an abnormality detection function of detecting an abnormality in the inverter circuits 3a and 3b, coil windings U1, V1, W1, U2, V2, and W2 of the motor 2, or the like, from the various kinds of input information, and when an abnormality is detected, the CPUs 10a and 10b cut off the current supply by turning off only a predetermined phase of the motor relay switching element 34 in accordance with the abnormality. Alternatively, the CPUs 10a and 10b can turn off the power supply relay switching elements 5a and 5b in order to cut off the battery 6 at source. Furthermore, when an abnormality is detected by the CPUs 10a and 10b, the CPUs 10a and 10b supply power to an alarm device 15, such as a lamp, via a drive circuit 16, thereby illuminating the alarm device 15. The power supply relay switching elements 5a and 5b may be enclosed inside the inverter circuits 3a and 3b respectively.

Meanwhile, the motor 2 is a brushless motor in which two 3-phase coil windings are delta connected, and in which are mounted rotation sensors 9a and 9b for detecting a rotation position of a rotor. In the case of the rotation sensors 9a and 9b too, two sensors are mounted, one in each winding, in order to maintain a redundant system, and rotation information thereof is transmitted to the input circuit 12 of each control circuit unit 4. Rather than a 3-phase delta connected brushless motor, the motor 2 may be a star connected brushless motor, or may be two bipolar pairs of brushed motors.

As heretofore described, each control unit 1 is configured so as to be able to independently drive the motor 2 by independently using input information, calculated values, and detected values. Also, a communication line 14 is connected between the two CPUs 10a and 10b so that data and information can be exchanged. From an exchange of information using the communication line 14, each of the CPUs 10a and 10b can ascertain an operating state of the other. For example, the matter that the CPU 10a has detected an abnormality and turned off a predetermined switching element can be transmitted to the CPU 10b. When an abnormality occurs in the CPU 10a or 10b itself, a regular communication signal using a predetermined format can no longer be exchanged, because of which one CPU can ascertain that an abnormality has occurred in the other CPU.

Next, using FIG. 2, a description will be given of a structure of the motor 2.

Figure 2:
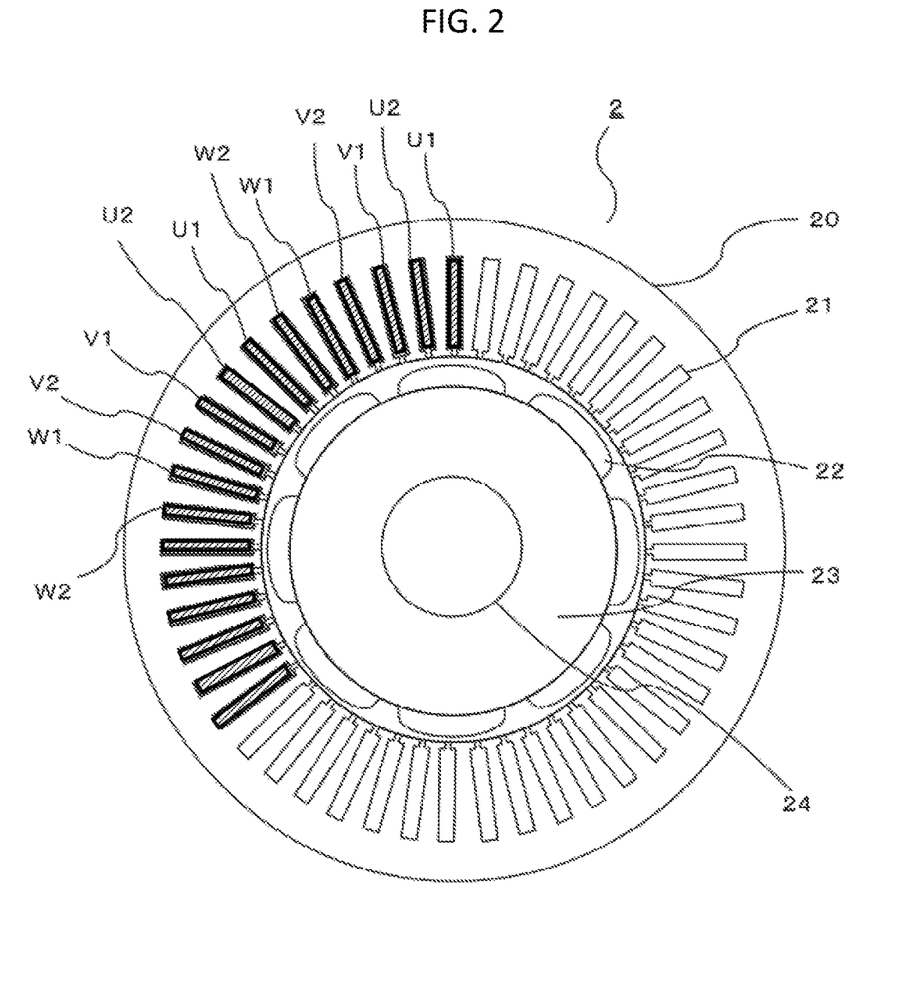
FIG. 2 is a top view of a motor used in the electric power steering device according to the first embodiment of the invention.
Figure 3:
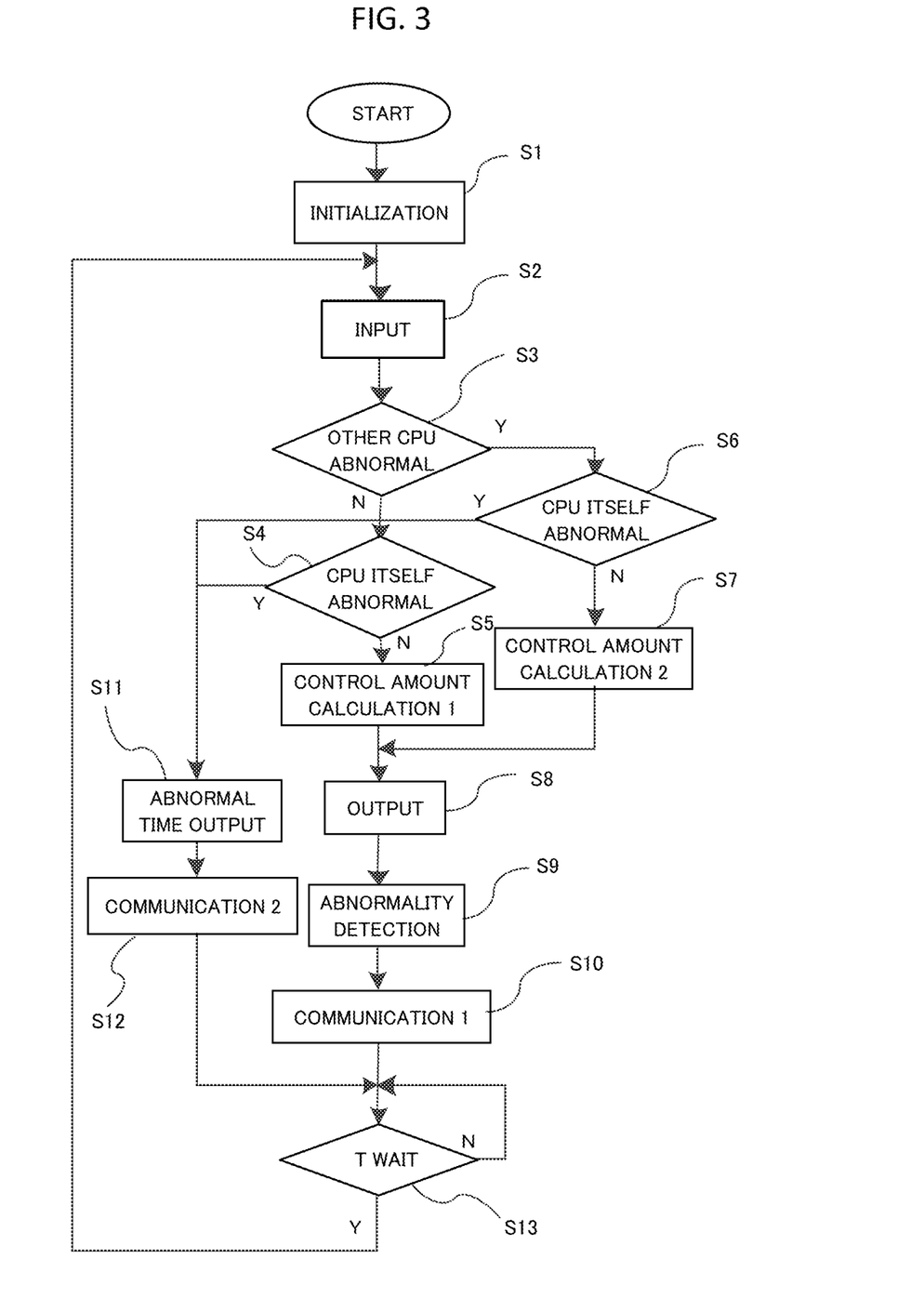
FIG. 3 is a flowchart illustrating an operation of the electric power steering device according to the first embodiment of the invention.

FIG. 2 is the motor 2 seen from an output shaft 24 side. A stator 20 is configured by stacking thin steel plates in which a large number (48 in FIG. 2) of slots 21 are disposed circumferentially. A rotor 23 is disposed concentrically in a center of the stator 20, and permanent magnets 22 are disposed in an order of N pole, S pole in predetermined positions on a periphery of the rotor 23 (8 poles in FIG. 2). The output shaft 24 is extended in a center of the rotor 23, and a gear coupled to a steering wheel operating device is disposed on a tip of the output shaft 24. Because of this, an assisting force that operates the steering wheel is generated by rotation of the output shaft 24. Consequently, it is necessary to control the rotation of the output shaft 24 so that a desired assisting force is obtained, and it is necessary to configure the motor 2 and control unit 1 in accordance with specifications thereof.

A multiple of coils, four for example, are disposed in the slots 21 of the stator 20. Coils extended from the slots 21 are wound, one portion of which situation is shown in the left half of FIG. 2. As shown in the circuit diagram of FIG. 1, there are two 3-phase windings, but first system windings and second system windings are each disposed in neighboring slots 21.

That is, looking at the U1 phase coil, a coil inserted in and extended from a predetermined slot 21 is shown inserted again across five slots in the sixth slot 21. In the same way, the second system U2 coil is inserted in the slot 21 next to the first system U1, next to which the first system V1 coil, second system V2 coil, first system W1 coil, and second system W2 coil are inserted regularly in order.

The coils are wound distributed as heretofore described, terminations of each coil are connected so as to form a delta connection, and coil termination portions are connected to the motor relay switching elements 34 of the inverter circuits 3a and 3b. Three terminations exist in each system, and each is connected independently to the inverter circuits 3a and 3b. Although there are two stator windings with respect to a single rotor, a so-called tandem type motor wherein two stators are configured in series may be adopted. In the case of a tandem type, however, the motor length is of a scale approximately twice that of one motor, and the overall device increases in size when mounted in a vehicle, which is extremely disadvantageous.

Next, a description will be given of a control operation using the heretofore described circuit configuration and motor structure.

As control of the device is almost entirely performed in accordance with a program of the CPU 10, a description will be given based on a CPU flowchart of FIG. 3. As the two CPUs 10a and 10b carry out practically the same process, the one CPU 10a will be described.

When the ignition switch 7 is engaged, power is supplied to the CPU 10a, and the process is started. Firstly, in step S1, a RAM, a ROM, an input/output port, and the like, are initialized. Next, in step S2, the CPU 10a acquires and stores all kinds of information input via the input circuit 12. Communication data of the other CPU 10b are also included in this information.

In step S3, the CPU 10a checks for the presence or otherwise of a detected abnormality in the other CPU 10b. The presence or otherwise of an abnormality in the other CPU 10b can be determined by deciphering the communication data of the other CPU 10b. When no abnormality has occurred in the other CPU 10b (N: No), the CPU 10a proceeds to step S4, and checks next for the presence or otherwise of an abnormality in the CPU 10a itself. Herein, when no abnormality is detected in the CPU 10a itself (N), the CPU 10a proceeds to step S5, and calculates a normal control amount 1 wherein no abnormality has occurred in either the CPU 10a or 10b.

Meanwhile, when an abnormality has occurred in the other CPU 10b in step S3 (Y: Yes), the CPU 10a proceeds to step S6, and checks for the presence or otherwise of an abnormality in the CPU 10a itself, in the same way as in step S4. Herein, when an abnormality has occurred in the CPU 10a itself (Y), the CPU 10a proceeds to step S11, and carries out a process for when there is an abnormality in the CPU 10a itself. When there is no abnormality in the CPU 10a itself (N), the CPU 10a proceeds to step S7, and calculates a control amount 2 under conditions wherein there is an abnormality in the other CPU 10b, and the CPU 10a itself is normal. Subsequently, the CPU 10a proceeds to step S8.

Next, when it is determined in step S4 or step S6 that an abnormality has occurred in the CPU 10a itself, the CPU 10a proceeds to step S11, and outputs a control signal so as to stop output to the drive circuit 11a. Control signals may be categorized into multiple levels based on the abnormality that has occurred. For example, when there is a ground fault or sky fault of a coil winding of the motor 2 or of a switching element of the inverter circuits 3a and 3b, the CPU 10a outputs a control signal so as to turn off all the switching elements, including the power supply relay switching element 5a. Also, when an open failure occurs in one of the upper and lower arm switching elements 31U, 31V, and 31W, or the motor relay switching elements 34U, 34V, and 34W, of the inverter circuits 3a and 3b, the CPU 10a can stop the drive of only the switching element of the phase in which the failure has occurred, and output a control command for the other phases as normal. Consequently, setting can be such that one portion of the control process can be continued in S11, except for a process when there is an abnormality such that everything is in a stopped state. When the previously described kind of 2-phase drive can be carried out, a control amount calculation process is also necessary, because of which it may be that processing in steps S5 and S7 is more efficient.

Next, in step S12, the CPU 10a transmits abnormal state data using the communication line 14. The transmitted data also include an abnormality level; for example, that all switching elements are in an off-state. Also, in a state wherein only a certain phase is turned off, the transmitted data can also include a ratio of the control amount in this case compared with that at a normal time, and the like, but communication of this kind of abnormality detail can also be processed via step S9 and step S10. By so doing, the other CPU 10b can ascertain the abnormality details. Consequently, the CPU 10a can correct and output the control amount of the CPU 10a itself in accordance with an abnormality of the other CPU 10b.

Next, a description will be given of a method of calculating the control amount in step S5 at a normal time wherein no abnormality has occurred in either control unit.

In step S5, a required current value is calculated in accordance with vehicle speed and torque, and divided into halves, in the same way as in an existing device. This halved current value is the control amount allocated to one control unit. Furthermore, the current currently being supplied is detected from the potential difference of the shunt resistor 33, and output as a control command value in accordance with the difference between a target value and the detected value.

Meanwhile, in step S7, as an abnormality has occurred in the other CPU 10b system, it is necessary for the CPU 10a to supply a current value required only by the system of the CPU 10a itself as a control amount calculation 2. Alternatively, when there is an abnormality in only one phase of the other CPU 10b system and two phases are being driven, the CPU 10a calculates so as to supply an approximately two-thirds current value, and outputs a control command value thus calculated. Also, when the other CPU 10b system is in a state wherein the motor cannot be driven at all, the CPU 10a controls so that all calculated control amounts are output in the system of the CPU 10a itself. Furthermore, when an abnormality has occurred in only one phase, as previously described, a 2-phase drive control amount can be calculated in step S5 or step S7. That is, the control amount can be obtained by calculating using practically the same procedure as at a normal time, and lastly correcting to a 2-phase drive control amount.

Next, in step S8, the CPU 10a outputs a control command so that the switching elements can be driven based on a control command value. As the upper and lower switching elements of the inverter circuits 3a and 3b are PWM (pulse width modulation) driven, the CPU 10a outputs a control signal in accordance therewith. In step S9, the CPU 10a checks for the presence or otherwise of an abnormality. Specifically, an abnormality can be detected using a method whereby current flowing to drive each switching element is detected in the shunt resistor 33, and by monitoring winding terminal voltage of the motor 2, and monitoring that a predetermined voltage appears in accordance with switching element drive.

Furthermore, when a discrepancy in a detected current value with respect to a target current value does not decrease even after a predetermined time elapses, there is a possibility of a leakage, because of which the CPU 10a can determine that there is an abnormality.

By monitoring the voltage and current of each portion to detect an abnormality, as heretofore described, the CPU 10a can detect even an abnormality in only one phase.

When detecting this kind of abnormality, the CPU 10a stores information including the abnormal state, and communicates the abnormal state via the communication line 14 to the other CPU 10b in step S10. When there is other necessary information, it is efficient when transmission of the other information is included in this process. For example, the accuracy of each other's control amount calculation can be checked by exchanging input circuit 12 information and control amount information.

Next, in step S13, the CPU 10a waits until a predetermined time, for example 5 seconds, elapses, and when the predetermined time elapses (Y), the CPU 10a returns to step S2 and advances the process again using the same procedure.

The heretofore described kind of CPU 10a processing operation is also executed in the same way by the CPU 10b, thereby forming a parallel redundant system.

Consequently, each control unit is allocated one-half of control of the motor 2 in a normal state wherein there is no abnormality, but when an abnormality occurs in one CPU, the normal CPU can continue 100% of the control even in a worst case, because of which there is no occurrence of a situation in which a driver's steering becomes difficult. Also, as the CPU 10a can include a function of notifying of an abnormality not only in the system of the CPU 10a itself but also in the other CPU 10b system, notification to the driver when an abnormality occurs is reliable, and the driver can also know which side of the motor 2 is abnormal. This notification can be realized by being carried out in step S10 or step S12, based on an output when there is an abnormality in step S9 or step S11.

Also, even at a normal time when no abnormality has occurred, an uneven control such as one-third to two-thirds can be carried out when, for example, the temperature of one control unit is higher than that of the other. This kind of situation is enabled by one control unit transmitting information requesting help from the other control unit via the communication line 14, thereby informing the other control unit. Also, when the control unit itself is also exposed to a high temperature, both control units are in a high load state, because of which the control units can prevent an occurrence of a failure by mutually reducing a target value. Furthermore, although a control amount assignation ratio can theoretically be changed in any way, the ratio having only two or three stages is advantageous in simplifying control specifications and simplifying the CPU program, and furthermore, in terms of responding when there is an abnormality in the CPU itself. For example, there can be three stages of level, with the normal side being 50%, 65%, or 100%, and the abnormal side being 50%, 35%, or 0%.

In the heretofore described embodiment, communication 1 and communication 2 of steps S10 and S12 are provided independently in two places, but as the output systems are provided independently taking the matter that an abnormality has occurred into consideration, communication 1 and communication 2 may be combined in one place. Also, although the abnormality detection means of step S9 is disposed after the output step S8, the abnormality detection means may be provided, for example, between step S2 and step S3.

Furthermore, a thermistor, which is temperature detection means, can be mounted in, for example, the inverter circuits 3a and 3b, a temperature difference ascertained by temperatures detected by the temperature detection means being input into the two CPUs 10a and 10b, and a higher control amount output by the CPU with the lower temperature than by the CPU with the higher temperature. Herein, as mounting a multiple of temperature detection means is unrealistic, a method may be such that temperature is estimated based on this value, or based on current supply, in places other than in the place of installation. In particular, when the temperature detection means is mounted in a vehicle, a difference in heat dissipation may occur depending on the mounting place and orientation, because of which it is desirable, if possible, that the temperature detection means is installed in a vicinity of the inverter circuits 3a and 3b or of the motor 2 windings, which have the greatest heat generation.

Further still, as a drive of the motor 2 is of a structure wherein the first system and second system are disposed displaced by an electrical angle of 30 degrees, as shown in FIG. 2, it is necessary that the first system and second system output control commands displaced in line with the structure. Because of this, an advantage is obtained in that noise and vibration can be reduced by a 30 degree phase difference control.

Also, taking into consideration a case wherein, in particular, the switching elements in each control unit are 100% driven, it is necessary that heat dissipation thereof is sufficiently maintained. Specifically, it is necessary to design taking a current capacity of an element itself, and a heat dissipating heatsink structure, into consideration. Also, with regard to the motor, it is necessary to design coil and magnet specifications, and the scale of each part, in order that a desired maximum torque with respect to rotation speed can be output with only one 3-phase coil winding.

Second Embodiment

Figure 4:
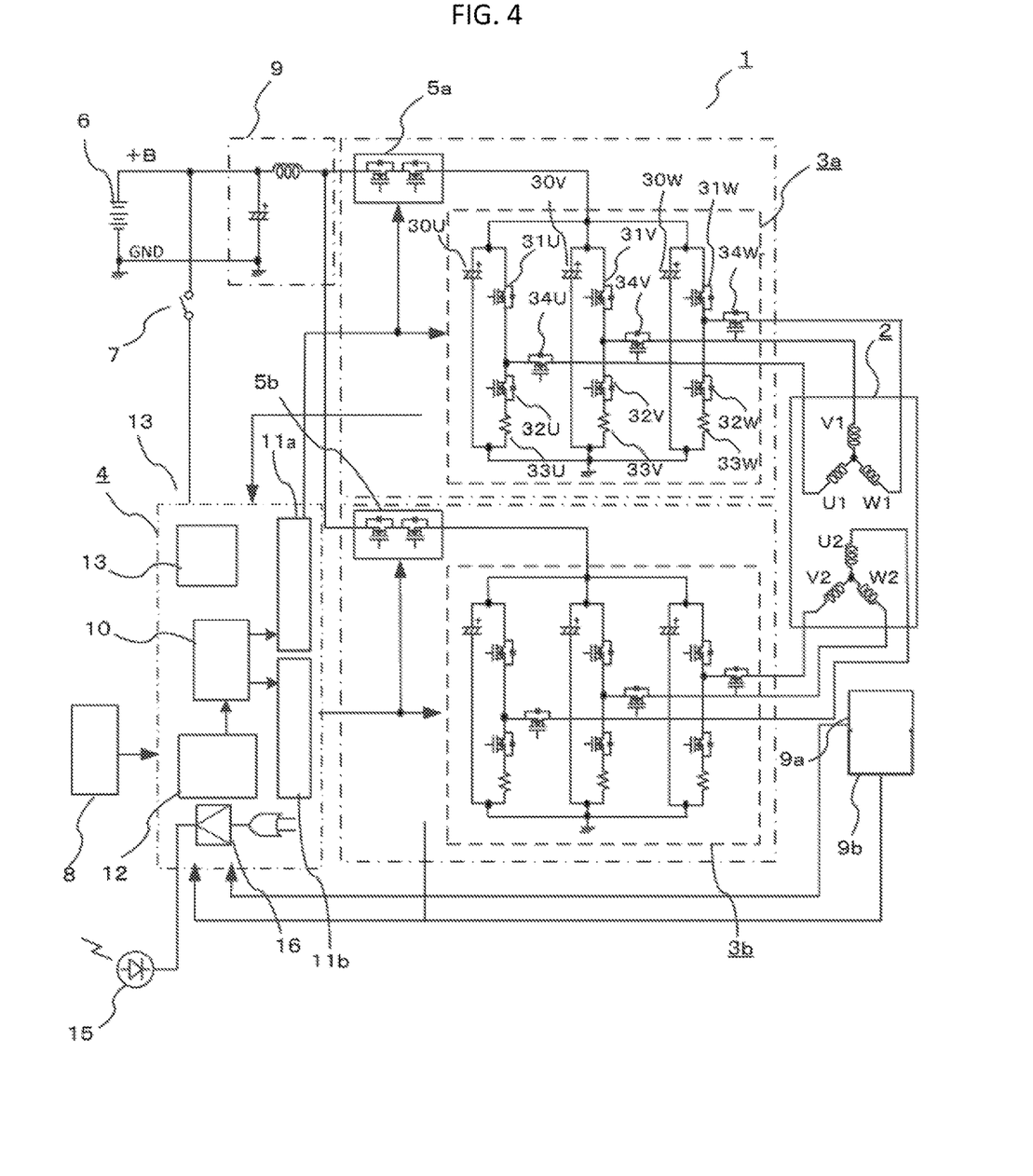
FIG. 4 is a circuit diagram showing a main portion configuration of an electric power steering device according to a second embodiment of the invention.

Next, using FIG. 4, a second embodiment of the invention will be described.

In the first embodiment, the control unit 1 is configured using the two CPUs 10a and 10b, but in the second embodiment, the CPUs 10a and 10b are configured of a single CPU 10. As other configurations are the same as in the first embodiment, the same reference signs are allotted, and a description will be omitted.

By adopting the single CPU 10 in this way, the state of the inverter circuits 3a and 3b, motor 2 windings, and drive circuits 11a and 11b can be ascertained without using the communication line 14, and a processing step thereof can be simplified. Consequently, there is an advantage in that output from the control unit 1 can be generated promptly, whereby a delay in steering wheel operation can be avoided.

Even when configuring using the single CPU 10, software configurations are provided independently, and moreover, calculation results such as control command values are stored separately, whereby a redundant system can be formed. Also, an output port of the CPU 10 being divided into differing ports means that, even when one port becomes abnormal, output to the drive circuits 11a and 11b can be continued using the other port. Furthermore, by the CPU 10 being integrated as a single unit, the scale can be reduced in comparison with the first embodiment, and by the communication line 14 being omitted, an occurrence of a communication error due to noise or the like is prevented, whereby reliability can be increased.

Figure 5A:
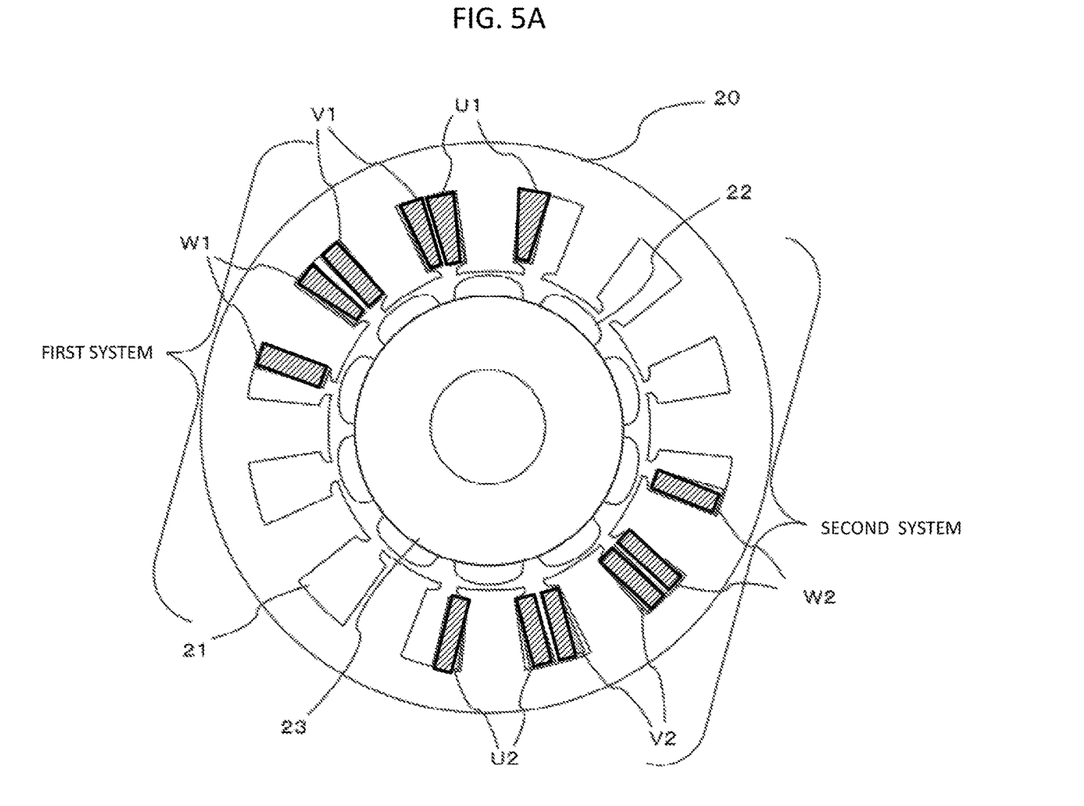
FIG. 5A is a top view showing a configuration of another motor used in the electric power steering device of the invention.
Figure 5B:
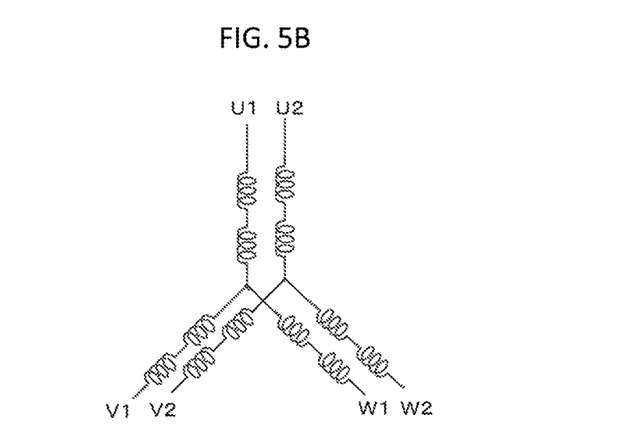
FIG. 5B is a diagram showing a winding connection state thereof.

FIG. 5 shows a structure of the motor 2 differing from the motor 2 in FIG. 2, and as there are two star-connected windings, the motor 2 is of two 3-phase windings. FIG. 5A is a top view of the motor, and FIG. 5B is a winding connection diagram.

A motor 2 coil winding method, differing considerably from that in the first embodiment, is such that the stator 20 of the motor 2 is configured of 10 poles and 12 slots, and the windings U1, V1, W1, U2, V2, and W2 are such that the first system and second system are each installed gathered together as illustrated in FIG. 5A. Herein, it is shown that the first system is inserted in six slots each on the left side in the drawing, and the second system is inserted in six slots each on the right side. Also, each winding is a large number of concentrated windings such that enclose one tooth.

By the windings being disposed in this way, there is no longer a need for the 30 degree phase difference control shown in the first embodiment or for a countermeasure against inter-system winding interference, as a result of which there is no longer a need for a strict synchronization of CPUs in two systems. Also, although the overall stator 20 is divided into two and distributed to the windings of each system, a winding such that the stator 20 is divided into four, and each system uses three neighboring slots each, can be employed. Furthermore, the connection may be a delta connection.

As heretofore described, the motor 2 and control unit 1 are configured so that each can be independently controlled as far as a maximum specification limit, because of which a desired assisting force can be generated by only one control system, even when an abnormality occurs.

Consequently, the driver can continue to drive safely.

Also, approximately one-half of the capacity held by each system is used at a normal time when no abnormality has occurred, a maximum rating is not kept low due to, for example, temperature or load, as is the case with an existing device, and control can be continued with leeway.

Furthermore, PWM control is carried out on the switching elements of the inverter circuits 3a and 3b, the modulation rate changes considerably between an abnormal time and a normal time, and as the modulation rate is controlled to be kept low at a normal time, the modulation rate barely changes between an abnormal time and a normal time, even when having two inverter circuits. This is because the total maximum current supply amount of the two inverter circuits corresponds to a current supply amount of an existing device.

As heretofore described, design is such that a 100% current supply is provided even with only one control system, two control systems share a motor drive in accordance with an operating state of each at a normal time, and by configuring so that when an abnormality occurs in one control system a 100% drive is carried out using only the other, normal control system, control can be carried out continuing an assisting force with respect to the driver's steering operation, whereby safer driving can be realized.

As a case wherein the driver does not notice an abnormality is envisaged, it is advantageous to configure so that the alarm device 15 is operated via the drive circuit 16 at an abnormal time, thereby notifying the driver of an abnormal state.

Each embodiment of the invention can be modified or abbreviated as appropriate, without departing from the scope of the invention.

REFERENCE SIGNS LIST

1: Control unit, 2: Motor, 3a, 3b: Inverter circuit, 4: Control circuit unit, 5a, 5b: Power supply relay, 8: Sensor, 9a, 9b: Rotation sensor, 10, 10a, 10b: Central processing unit (CPU), 11a, 11b: Drive circuit, 12: Input circuit, 13: Power supply circuit, 14: Communication line, 20: Stator, 21: Slot, 22: Magnet, 23: Rotor, 24: Output shaft.

The invention claimed is:

1. An electric power steering device, comprising:
an electric motor that causes a vehicle steering mechanism to rotate; and
a controller that drives the motor,
the motor having a stator including two independent windings with respect to a single rotor, and the controller being formed of two control systems that supply control signals to each of the motor windings, wherein
the controller is configured so as to, when an abnormality occurs in one winding of the motor or in one control system inside the controller, cut a supply of current to the winding in which the abnormality has occurred to zero and drive the motor by supplying a predetermined current necessary at a normal time to the other winding, and configured so as to share a supply of the predetermined current between the two windings at a time of normal drive when no abnormality has occurred, thereby driving the motor,
wherein the one control system of the two control systems controls the one winding of the two independent windings and an other control system of the two control systems controls the other winding of the two independent windings,
wherein the one control system transmits a notification to the other control system when the abnormality occurs in the one winding or in the one control system, the notification including a type of abnormality occurring in the one winding or in the one control system,
wherein the other control system adjusts a current supplied to the other winding according to the type of abnormality occurring in the one winding or in the one control system,
wherein the one winding comprises a three-phase winding, and
wherein the controller is configured so as to, in response to an open failure occurring in a first phase of the three-phase winding, cut a supply of current to the first phase to zero and drive the motor by supplying a predetermined current necessary at a normal time to second and third phases of the three-phase winding,
wherein the controller includes a communication line connecting the one control system with the other control system, and
wherein the one control system determines that an abnormality has occurred in the other control system in response to no communication signal being received by the one control system on the communication line,
wherein the one winding is positioned on the stator without overlapping the other winding in a circumferential direction of the stator.

2. The electric power steering device according to claim 1, wherein a configuration is such that the supply of current at a time of normal drive when no abnormality has occurred is provided to each winding as one-half of the current supplied to one winding at an abnormal time, thereby driving the motor.

3. The electric power steering device according to claim 1, wherein the controller is configured so as to carry out a drive at a time of normal drive when no abnormality has occurred by reducing a control modulation rate with respect to when driving the motor with one system at an abnormal time.

4. The electric power steering device according to claim 1, wherein the controller has two inverter circuits that supply power to the motor, and each inverter circuit is configured so as to have a capacity twice as large with respect to an allowable current capacity or heat capacity when assigned one-half of the current supply.

5. The electric power steering device according to claim 2, wherein the controller has two inverter circuits that supply power to the motor, and each inverter circuit is configured so as to have a capacity twice as large with respect to an allowable current capacity or heat capacity when assigned one-half of the current supply.

6. The electric power steering device according to claim 1, wherein the controller is configured so as to detect or estimate temperature of the inverter circuit or winding at a normal time, and adjust a share ratio in accordance with the temperature.

7. The electric power steering device according to claim 2, wherein the controller is configured so as to detect or estimate temperature of the inverter circuit or winding at a normal time, and adjust a share ratio in accordance with the temperature.

8. The electric power steering device according to claim 1, wherein the controller is configured so as to have means of detecting an abnormality in each portion, and when determining that the one of the two control systems is normal while the other is abnormal, raise a control command of the one system to 100%, and notify the one system that the other system is abnormal.

9. The electric power steering device according to claim 2, wherein the controller is configured so as to have means of detecting an abnormality in each portion, and when determining that the one of the two control systems is normal while the other is abnormal, raise a control command of the one system to 100%, and notify the one system that the other system is abnormal.

10. The electric power steering device according to claim 1, wherein the motor is configured so as to be able to output a desired torque with respect to rotation speed even when driven by only one system.

11. The electric power steering device according to claim 2, wherein the motor is configured so as to be able to output a desired torque with respect to rotation speed even when driven by only one system.

12. The electric power steering device according to claim 1, wherein the motor is formed of two windings, a distributed winding having a predetermined phase difference or a concentrated winding having no phase difference.

13. The electric power steering device according to claim 2, wherein the motor is formed of two windings, a distributed winding having a predetermined phase difference or a concentrated winding having no phase difference.

14. The electric power steering device according to claim 1, wherein the controller is configured of a control circuit unit in which a CPU is mounted, an inverter circuit, and a power supply relay unit, and
wherein a drive circuit connecting the CPU and inverter circuit, the CPU, and the power supply relay unit are each formed as circuit configurations of the two control systems.

15. The electric power steering device according to claim 2, wherein the controller is configured of a control circuit unit in which a CPU is mounted, an inverter circuit, and a power supply relay unit, and wherein a drive circuit connecting the CPU and inverter circuit, the CPU, and the power supply relay unit are each formed as circuit configurations of the two control systems.

16. The electric power steering device according to claim 1, wherein the one control system notifies the other control system using the communication line when the abnormality occurs in the one winding or in the one control system.

17. The electric power steering device according to claim 1,
wherein, in response to the type of abnormality including an abnormality in only one phase of the one winding, the current supplied to the other winding is adjusted to two-thirds of the predetermined current.

* * * * *